Jan. 14, 1941.   L. T. HAMNER ET AL   2,228,700
PNEUMATIC ACTUATING AND CONTROLLING APPARATUS FOR BOTTLE FILLING MACHINES
Filed March 14, 1938   2 Sheets-Sheet 2
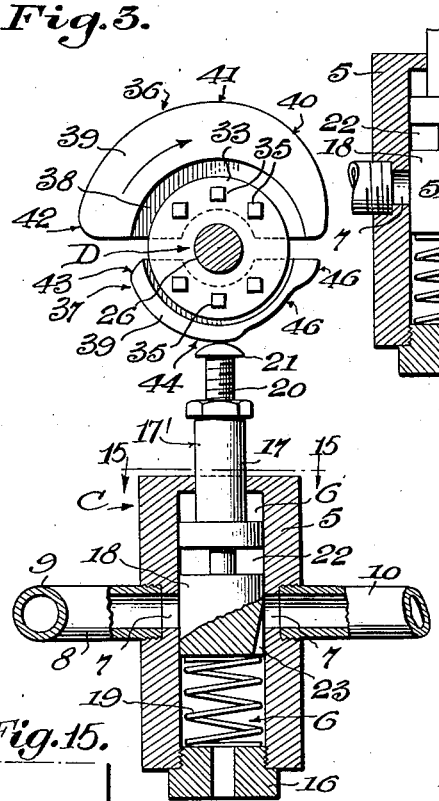
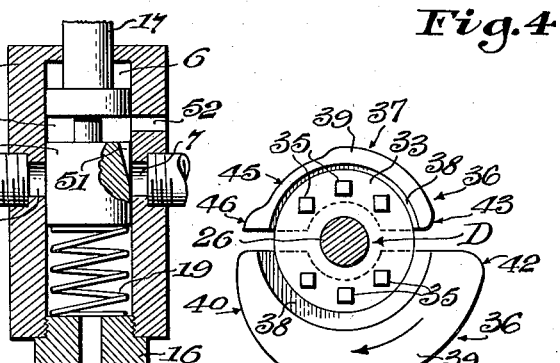
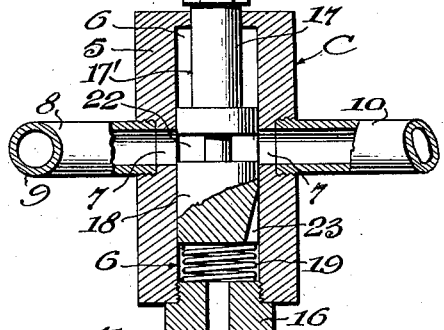
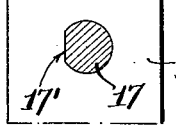
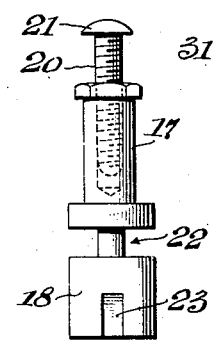
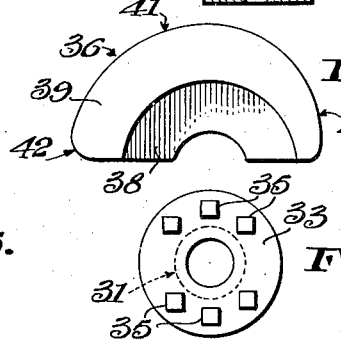
Inventors
Lewis T. Hamner
William B. Hamner
By Mason & Porter
Attorneys Patented Jan. 14, 1941

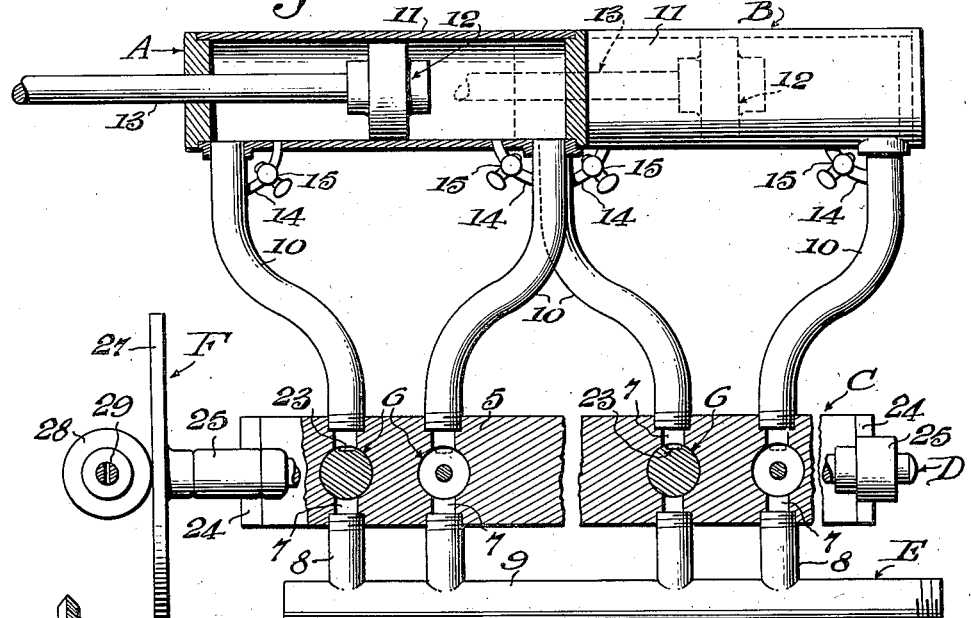

2,228,700

UNITED STATES PATENT OFFICE 2,228,700

PNEUMATIC ACTUATING AND CONTROLLING APPARATUS FOR BOTTLE FILLING MACHINES

Lewis T. Hamner and William B. Hamner, Petersburg, Va., assignors to William L. Zimmer, Jr., Petersburg, Va.

Application March 14, 1938, Serial No. 195,880

12 Claims. (Cl. 121—1)

The invention relates generally to apparatus for actuating and controlling the actuation of a plurality of machine elements or units of mechanism and primarily seeks to provide a novel pneumatically actuated and controlled apparatus of this type.

Apparatus of this type is adaptable to use in various forms of machines, and for mere purposes of illustration we refer briefly herein to machines employed in the art of filling bottles or like containers as examples of machines presenting the actuation and control problems sought to be solved.

An example of bottle filling machine is to be found in United States Letters Patent #1,416,345 issued to A. J. Gosselin, May 16, 1922. Like other apparatus of this type, this machine includes a conveyor for feeding a group of bottles into position, a pusher for transferring the group of bottles to a platen, means for bringing about relative movement between the platen and the nozzles of a filling head to properly position the group of bottles with relation to said nozzles, and after filling, to restore these parts to normal, a conveyor to move the group of filled bottles to a closing station, and closure applying devices. For various reasons, such as the desire to fill bottles of different size, or bottles of the same size with liquids varying in viscosity, it is essential that provision be made for varying the periods of operation of certain elements of the machine relative to the periods of operation of companion elements without altering the time to be consumed by the whole cycle of operations, to vary the speed of the whole cycle without disturbing the synchronization and duration of the periods of operation of the individual elements included in the cycle, or to vary the speed of the whole cycle and also the synchronization and duration of the periods of operation of the individual elements included in the cycle.

An object of the invention is to provide novel pneumatically actuated apparatus for operating individual machine elements of the nature of those above referred to and for controlling or regulating the combined or individual periods of operation or relative timing of said elements in the manner stated.

In its more detailed nature, the invention resides in the provision of a suction motor including a piston and plunger for actuating each of a plurality of individual machine elements, a master control valve common to all the motors and including pairs of valves, each pair of which is associated with one motor for alternately affording communication between the respective sides of the particular motor piston and atmospheric pressure, or a negative pressure or suction source, a cam shaft common to all of the valves and having valve actuating cams thereon adjustable to vary the relation of the periods of operation of the respective motors, and means for varying the speed of operation of the cam shaft.

Another object of the invention is to provide novel means for varying the amount and speed of movement of the individual suction motors.

Another object of the invention is to provide novel means for preventing jumping of the motor pistons at the commencement of strokes thereof in either direction.

Another object of the invention is to provide novel means for gradually starting, then accelerating, and then gradually stopping the motor piston strokes.

Another object of the invention is to provide novel suction source and atmospheric pressure communication control valve structures including means for controlling the relation of said valves to their actuating cams.

Another object of the invention is to provide novel valve controlling cams adjustable to vary the degree of movement imparted to the individual valves, and also to vary the relative timing or synchronization of the individual valve functions.

With the above and other objects in view which will hereinafter appear, the nature of the invention will be more fully understood by following the detailed description, the appended claims, and the several views illustrated in the accompanying drawings.

In the drawings:

Fig. 1 is a somewhat diagrammatic horizontal longitudinal section illustrating the master control valve and two machine element actuating motors connected therewith;

Fig. 2 is a vertical longitudinal section of the master valve, parts being shown in elevation;

Fig. 3 is a vertical cross section taken on the line 3—3 on Fig. 2;

Fig. 4 is a vertical cross section taken on the line 4—4 on Fig. 2;

Figs. 5 and 6 are detail views illustrating one of the adjustable cam heads in edge and face view respectively;

Figs. 7 and 8 are detail views illustrating one of the adjustable suction or negative pressure communication controlling cam elements in edge and face view respectively;

Figs. 9 and 10 are detail views illustrating one of the adjustable atmospheric pressure vent controlling cam elements in edge and face view respectively;

Fig. 11 is a detail view of one of the individual valve plungers;

Fig. 12 is a fragmentary vertical longitudinal section through the positions of a pair of individual valves and illustrates a modified form of means for preventing marked pressure overbalance and piston jumping at the change stroke periods of pneumatic motor operation;

Fig. 13 is a detail vertical cross section of an individual valve embodying a modified arrangement of atmospheric pressure venting means;

Fig. 14 is a detail vertical section illustrating a modified form of pneumatically actuated motor, and Fig. 15 is a detail cross section taken on the line 15—15 on Fig. 3.

In the drawings we have disclosed the invention applied for controlling two units of mechanism, but it is to be understood that the master valve and control devices may be associated with a greater number of elements of mechanism and the motors by which movement is imparted to such elements.

In the drawings the motors are generally designated A and B, the master valve C, the driver and valve actuating shaft D, the negative pressure or suction source E, and the variable speed drive devices F. The suction source hereinafter referred to is illustrated in the form of a simple manifold adapted to be connected with a suction pump or any other negative pressure source (not shown).

The master valve includes a casing 5 bored to provide a plurality of valve plunger chambers 6 disposed in adjacent pairs, as shown in Figures 1 and 2 of the drawings.

The valve casing 5 also includes transverse bores 7 which intersect the valve plunger chamber 6 and which communicate, at one side of the casing through ducts 8 with the suction manifold 9, and at the other side through ducts 10 with the respective ends of the motors A, B. The motors shown in Fig. 1 of the drawings are in the form of simple cylinders 11 in which are mounted pistons 12, the piston rods 13 being projected through end walls of the cylinders for connection with the particular units of mechanism adapted to be actuated by the motors. It will be understood that the valve plunger chambers 6 are arranged in adjacent pairs, and the ducts 10 communicating with adjacent pairs of the chambers connect at the opposite ends of the respective motors as illustrated in Fig. 1 of the drawings.

At each end of each motor cylinder 11 a small by-pass duct 14 is provided and positioned for communicating between the respective duct 10 and the interior of the cylinder inwardly of said duct a sufficient distance so that when the piston head is positioned at one end or the other of the cylinder communication between the interior of the duct and the interior of the cylinder at opposite sides of said head will be afforded by the main duct and the associated by-pass. Each by-pass duct 14 is valve-controlled, as at 15, and the purpose of these ducts will be enlarged upon hereinafter.

Each valve plunger chamber is closed at one end by a vented plug 16, and by a casing wall at its other end. Each casing wall is apertured to receive the valve stem 17 of a valve plunger 18 reciprocable within the respective chamber 6 and urged toward said casing wall by a spring 19 interposed between the plunger and the closure plug 16, as illustrated in Fig. 2 of the drawings. A tappet screw 20 is adjustably mounted in each valve stem 17, and secured by the usual lock nut, and each screw carries a tappet head 21. Any suitable means may be provided for preventing the valves from rotating and, for example, each valve stem 17 has a flattened portion at 17' and the aperture engaged thereby is shaped in conformity therewith, as best shown in Fig. 15.

Each of the valve plungers includes a reduced portion forming an annular suction port 22, and in the side wall of each valve plunger opposed to the associated duct 10, is formed a venting port 23 in the form of a V-notch downwardly directed in the manner illustrated in Fig. 3 of the drawings so that communication will be afforded through the vented plug 16 and the venting port 23 with the associated duct 10 to a greater or lesser degree accordingly as the valve plunger is elevated to a greater or lesser degree. In other words, when the parts are formed and proportioned as shown in Fig. 3 of the drawings, the vent communication will be opened to the maximum at the maximum elevation of the plunger and this communication will be gradually diminished as the plunger is lowered. The purpose of this vent porting will become apparent as the description progresses.

End plates 24 are secured to the ends of the casing 5 and support bearings 25 for the cam shaft 26. Rotation is imparted to the shaft 26 by any suitable variable speed driving mechanism, and in this particular illustration we have shown a disc 27 secured upon the shaft and engaged by a driver roller 28 spline-connected to a drive shaft 29 to which rotation is imparted from any suitable power source (not shown), through suitable power transmitted connections 30.

A cam head is associated with each valve plunger and each head comprises a hub 31, adjustably secured upon the shaft, as at 32, so that it can be adjusted about the axis of the shaft, and spaced flanges 33 forming an annular grooveway 34 to receive the flanges of valve plunger position controlling cam elements adjustably secured upon the head through the medium of set screws 35.

A pair of cams are mounted in each groove, as shown in Figs. 3 and 4 of the drawings, one a suction or negative pressure communication controlling cam, and the other an atmospheric pressure or vent communicating cam, the former being generally designated 36, and the latter 37, Each of the cams includes a clamp flange or rib 38, and an effective peripheral flange or enlargement 39, and extends about approximately 180° of the circumference of the particular cam head.

The suction communication controlling cam 36 includes a lead or lift portion 40, a dwell portion 41, and a receding portion 42, but it is to be understood that these effective control surfaces may be varied to suit the demands of the particular installation. Similarly the vent controlling cam 37 includes a receiving portion 43, and a dwell portion 44, and it may also include a recession or cavity 45 designed to bring about an accelerated movement of the piston which it controls, in a manner later to be described, and a lift portion 46 designed to bring about a retardation of piston speed at the respective stroke ends.

It will be observed by reference to Figs. 3 to 10 of the drawings that the individual valve plunger tappet heads 21 can be adjusted with relation to the associated valve plungers and control cam elements, and the control cam elements 36 and 37 can be adjusted inwardly or outwardly in the receiving grooveways 34, the concentricity of the flange portions and the supporting head being retained, or said units may be tilted within their grooveway mountings so as to alter the effects of the cam surfaces thereof. Adjustment of the tappet screws will serve to give a minimum or maximum of venting. The cam elements can be adjusted in their grooveways to compensate for the tappet screw adjustments so as to enable the adjustment of the venting without varying the suction control cycle, the cam elements can be adjusted without adjusting the tappet screws for altering the suction cycle without altering the venting control, or both controls can be varied to suit the demands of our improved control equipment.

In describing the operation of the control apparatus, it is necessary to refer only to one motor and its associated pair of valve plungers. See Figs. 1 to 4 of the drawings. With the parts positioned as shown in these figures, the valve plunger, shown in Fig. 3 and at the left in Fig. 2, is in the venting or atmospheric pressure admitting position, and the adjacent companion valve of the pair, shown also in Fig. 4 of the drawings, is at the negative pressure or suction communication controlling position. In this position of the parts the piston is being moved to the right as indicated in Fig. 1.

It will be observed by reference to Fig. 4 of the drawings that the negative pressure controlling valve tappet is riding the dwell portion 41 of the suction communication control cam and this position of the valve plunger will be maintained until the receding portion 42 of the cam is reached when the plunger will be forced upwardly by its spring to close off the negative pressure communication and open the atmospheric vent. The vent control valve plunger tappet (Fig. 3) is about to drop into the recession 45 of the vent control cam, and when this occurs the plunger will be permitted to rise slightly and to increase the amount of atmospheric air admitted to the cylinder 11 by the piston as shown in Fig. 1 of the drawings. This accelerated movement of the piston will be continued until the lift portion 46 of the cam is encountered, when the air venting will be materially diminished and the speed of movement of the plunger will be retarded at the end of the stroke.

At the end of the stroke of the piston toward the right in Figure 1, the valve plunger tappet shown in Fig. 3 will start engagement with the lift portion 40 of the suction communication controlling cam so that the position of this plunger will gradually be reversed to the position shown in Fig. 4. At the same time the valve plunger tappet shown in Fig. 4 will be starting in contact with the dwell portion 44 of the vent control cam so that the position of this valve plunger will be reverse to that shown in Fig. 3. With this reversal of the positions of the valve plungers, the space at the right of the piston (Fig. 1), formerly opened to the vacuum source, will now be vented to atmosphere, and the space at the left of the piston, formerly vented to atmosphere, will be in communication with the negative pressure or suction source in the manifold 9.

In order to prevent jumping of the piston at each change of stroke thereof, due to the sudden overbalancing of pressures at the respective faces of the pistons, the by-passing equipments 14, 15 are provided. By reason of this equipment each time the space behind the piston is vented to atmosphere at the end of its stroke, the respective by-pass will partially equalize the pressures at the respective sides of the pistons so as to avoid jumping of the pistons and effect a smooth starting of the pistons in the opposite directions. Adjustments of the valves 15 enables the changing of the degree of pressure equalization, and it is to be understood that the amount of pressure admitted through the ducts 14 in advance of the piston must always be less than the pressure entering through the main ducts 10 behind the piston.

In Fig. 12 of the drawings I have illustrated a modified form of means for preventing jumping of the pistons at the stroke changes. In this modification a by-pass duct 47 communicates between adjacent pairs of valve chambers, each such by-pass being controlled by an adjustment screw 48. In this use, the respective valve plungers are modified to include a face clearance 49 passing part way around the valve body, and a vertical leg 50 adapted to communicate with the by-pass duct 47. In this form of control the by-passing equipment will afford communication between the suction port in one valve plunger and the associated negative pressure communications and with the atmospheric pressure communication equipments of the cooperating valve equipment so as to form temporary partial balance of the pressures in the respective ends of the cylinders at each change stroke of the piston.

In Fig. 13 of the drawings we have illustrated a modified form of venting port. In this modification the vent notch 51 is enlarged upwardly, instead of downwardly as hereinbefore described, and a side vent port 52 is formed in the casing wall in position for communicating with the suction port in the valve plunger. With this equipment the degree of venting will be gradually diminished as the valve plunger moves upwardly instead of downwardly.

In Fig. 14 of the drawings we have illustrated a modified form of pneumatically actuated motor in which the motor is in the form of a 2-part casing 53 and includes a diaphragm 54 clamped between the casing parts, and a plunger 55 secured to the diaphragm and projecting through a wall of the casing for connection with the machine element to be actuated. This motor includes suitable duct ports 56 for connection with the respective control valves.

By control-venting one end of the motor cylinder to atmosphere and controlling the negative pressure or vacuum source communication as hereinbefore described, it is possible to control the speed of travel of the piston to a nicety. Its movement can be accelerated at will by adjustment of the cams and tappets, its movement can be suitably retarded at the ends of the strokes, and means is provided for avoiding the jumping or fast starting of the piston at the stroke changes thereof.

In the equipment herein shown and described, we have provided means for varying the period of operation of individual elements of mechanism relative to each other without varying the time interval of the whole cycle or the synchronization of the periods of operation of the individual elements; or for varying the speed of the whole cycle and also the synchronization and duration of the individual element operation periods.

In the drawings we have illustrated the pairs of valve units arranged in line but it is to be understood they may be positioned in any desired manner along or about the axis of the drive or control shaft. It will be obvious also that by altering the positions of the cam heads about the axis of the shaft the synchronization of the various units controlled by the valves can be altered, that is, the time in the complete cycle at which each unit will start or conclude its operation can be changed without disturbing the speed of the cycle or the controls for the individual units hereinbefore described.

What we claim is:

1. In control apparatus for a plurality of pneumatically actuated reciprocable piston machine element driving motors, valve means for controlling the operation of each motor by alternately reversing unbalanced pressure conditions therein, a common actuator for all of the valves, and by-pass means controlled by said valve means for partially balancing pressure conditions in the motors at each change stroke to provide smooth starting travel reversal of the pistons.

2. In apparatus for actuating and controlling a plurality of suction motors each including a piston and a plunger adapted to actuate an individual machine element, a pair of reciprocable control valves associated with each motor for alternately affording communication between the respective sides of the motor piston and atmospheric or negative pressure sources, and a cam shaft common to all of the valves and having valve actuating cams thereon said cams and valves including cooperating devices for controlling the amount of movement of the individual valves and also the place at which each valve movement or stroke will begin and end to enable said valves to vary the atmospheric and negative pressure communications.

3. In apparatus for actuating and controlling a plurality of suction motors each including a piston and a plunger adapted to actuate an individual machine element; a pair of control valves associated with each motor for alternately affording communication between the respective sides of the motor piston and atmospheric or negative pressure sources, each valve of a pair including a casing portion having a valve chamber, an atmospheric vent and a cross port connected at one side of the chamber to a source of negative pressure and at the other side with the associated motor at one side of the piston thereof, a valve body movable in each chamber and including a stem projecting from the chamber, a suction port for communicating across the cross port at one position of the valve body, and an air venting duct communicating between one end of the associated motor and the atmospheric vent at another position of the valve body; and a cam shaft common to all of the valves and having valve actuating cams thereon for imparting movement to said valve stems for alternately shifting the positions of said valve bodies, said cams and valves including cooperating adjustable devices for individually or collectively altering the durations of the atmospheric pressure communications alone, the negative pressure communications alone, or both communications in varying degrees.

4. In apparatus of the character described a reciprocable piston motor; a control valve including a casing portion having two valve chambers, an atmospheric vent communicating with each chamber, and a cross port intersecting each chamber and connected at one side of the chamber to a source of negative pressure and at the other side with the motor at one side of the piston thereof; a valve plunger reciprocable in each chamber and having a stem projecting from the chamber, a suction port communicating across the cross port at one position of the valve plunger, and an air venting duct communicating between one end of the motor and the atmospheric vent at another position of the valve plunger and shaped to effect a greater or lesser communication accordingly as the plunger is moved a greater or lesser distance with relation to said cross port; and adjustable cam devices for actuating said valve plunger stems.

5. In apparatus of the character described a reciprocable piston motor; a control valve including a casing portion having two valve chambers, an atmospheric vent communicating with each chamber, and a cross port intersecting each chamber and connected at one side of the chamber to a source of negative pressure and at the other side with the motor at one side of the piston thereof; a valve plunger reciprocable in each chamber and having a stem projecting from the chamber, a suction port communicating across the cross port at one position of the valve plunger, and an air venting duct communicating between one end of the motor and the atmospheric vent at another position of the valve plunger and shaped to effect a greater or lesser communication accordingly as the plunger is moved a greater or lesser distance with relation to said cross port; and means for variably alternating the positions of the valve plungers comprising a rotary cam shaft, tappets carried by the valve stems and adjustable toward and from the shaft, and cam devices including cam faces adjustable toward and from the tappets.

6. In apparatus of the character described a reciprocable piston motor; a control valve including a casing portion having two valve chambers, an atmospheric vent communicating with each chamber, and a cross port intersecting each chamber and connected at one side of the chamber to a source of negative pressure and at the other side with the motor at one side of the piston thereof; a valve plunger reciprocable in each chamber and having a stem projecting from the chamber, a suction port communicating across the cross port at one position of the valve plunger, and an air venting duct communicating between one end of the motor and the atmospheric vent at another position of the valve plunger and shaped to effect a greater or lesser communication accordingly as the plunger is moved a greater or lesser distance with relation to said cross port; and means for variably alternating the positions of the valve plungers comprising a rotary cam shaft, tappets carried by the valve stems and adjustable toward and from the shaft, a cam head secured upon the shaft adjacent each valve stem and each having an annular groove, and a suction communication control cam element and a vent control cam element individually adjustably mounted in each groove for adjustment toward and from said tappets.

7. In apparatus of the character described a reciprocable piston motor; a control valve including a casing portion having two valve chambers, an atmospheric vent communicating with each chamber, and a cross port intersecting each chamber and connected at one side of the chamber to a source of negative pressure and at the other side with the motor at one side of the piston thereof; a valve plunger reciprocable in each chamber and having a stem projecting from the chamber, a suction port communicating across the cross port at one position of the valve plunger, and an air venting duct communicating between one end of the motor and the atmospheric vent at another position of the valve plunger and shaped to effect a greater or lesser communication accordingly as the plunger is moved a greater or lesser distance with relation to said cross port; and means for variably alternating the positions of the valve plungers comprising a rotary cam shaft, tappets carried by the valve stems and adjustable toward and from the shaft, a cam head secured upon the shaft adjacent each valve stem and each having an annular groove, and a suction communication control cam element and a vent control cam element individually adjustably mounted in each groove for adjustment toward and from said tappets, each said head being adjustable about the axis of said shaft.

8. In apparatus for actuating and controlling the actuation of a plurality of machine elements through a cycle of functions, each of which elements is actuated by a pneumatic motor of the reciprocating piston type, a common actuator, valve means for controlling the degree of pressure evacuation from one side of each piston and the degree of pressure application at the opposite side of each piston, and individually adjustable movement transmitting devices for imparting movement to each valve means from the common actuator whereby each valve means is adapted to control the speed of stroke of said associated piston.

9. In apparatus for actuating and controlling the actuation of a plurality of machine elements through a cycle of functions, each of which elements is actuated by a pneumatic motor of the reciprocating piston type, a common actuator, valve means for controlling the degree of pressure evacuation from one side of each piston and the degree of pressure application at the opposite side of each piston, and individually adjustable movement transmitting devices for imparting movement to each valve means from the common actuator whereby each valve means is adapted to control the speed of stroke of said associated piston, and means for varying the speed of operation of the common actuator.

10. In apparatus for actuating and controlling the actuation of a plurality of machine elements through a cycle of functions, each of which elements is actuated by a pneumatic motor of the reciprocating piston type, a common actuator, valve means for controlling the degree of pressure evacuation from one side of each piston and the degree of pressure application at the opposite side of each piston, and individually adjustable movement transmitting devices for imparting movement to each valve means from the common actuator whereby each valve means is adapted to control the speed of stroke of said associated piston, said valve means including an individual valve for controlling the pressure condition at each side of each piston.

11. In apparatus for actuating and controlling the actuation of a plurality of machine elements through a cycle of functions, each of which elements is actuated by a pneumatic motor of the reciprocating piston type, a common actuator, valve means for controlling the degree of pressure evacuation from one side of each piston and the degree of pressure application at the opposite side of each piston, and individually adjustable movement transmitting devices for imparting movement to each valve means from the common actuator whereby each valve means is adapted to control the speed of stroke of said associated piston, said valve means including an individual valve for controlling the pressure condition at each side of each piston, and said device including cam means mounted for adjustment about the axis of said shaft and engageable with each said valve.

12. In apparatus for actuating and controlling the actuation of a plurality of machine elements through a cycle of functions, each of which elements is actuated by a pneumatic motor of the reciprocating piston type, a common actuator, valve means for controlling the degree of pressure evacuation from one side of each piston and the degree of pressure application at the opposite side of each piston, and individually adjustable movement transmitting devices for imparting movement to each valve means from the common actuator whereby each valve means is adapted to control the speed of stroke of said associated piston, and by-pass means controlled by said valve means for partially balancing pressure conditions at opposite sides of each piston at each change stroke to provide smooth starting travel reversal of the pistons.

LEWIS T. HAMNER.
WILLIAM B. HAMNER.